(12) United States Patent
Berger et al.

(10) Patent No.: US 11,555,470 B2
(45) Date of Patent: Jan. 17, 2023

(54) MULTIPLE PIECE PISTON

(71) Applicant: Woodward, Inc., Fort Collins, CO (US)

(72) Inventors: Seth Berger, Los Angeles, CA (US); Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/479,900

(22) Filed: Sep. 20, 2021

(65) Prior Publication Data
US 2022/0178329 A1 Jun. 9, 2022

Related U.S. Application Data

(62) Division of application No. 16/401,713, filed on May 2, 2019, now Pat. No. 11,156,186.

(51) Int. Cl.
*F02K 1/76* (2006.01)
*F15B 15/26* (2006.01)

(52) U.S. Cl.
CPC .............. *F02K 1/763* (2013.01); *F02K 1/766* (2013.01); *F15B 15/26* (2013.01)

(58) Field of Classification Search
CPC .......... F02K 1/763; F02K 1/766; F15B 15/26; F15B 15/261; F15B 2215/30; F16H 25/2454
See application file for complete search history.

(56) References Cited

U.S. PATENT DOCUMENTS

| | | | |
|---|---|---|---|
| 2,935,048 A | 5/1960 | Geyer | |
| 3,092,082 A * | 6/1963 | Geyer | F15B 15/24 92/33 |
| 4,442,928 A * | 4/1984 | Eastman | F02K 1/763 477/185 |
| 8,715,132 B2 | 5/2014 | Kopecek | |
| 8,932,176 B2 | 1/2015 | Kopecek | |
| 2019/0078437 A1 | 3/2019 | Wang et al. | |
| 2020/0347802 A1 | 11/2020 | Berger | |

FOREIGN PATENT DOCUMENTS

CN 108100922 6/2018

OTHER PUBLICATIONS

Ferretti et al., "Seismic damage on merlons in masonry fortified building: A parametric analysis for overturning mechanism", Engineering Structures, Dec. 2018, p. 5.
PCT International Preliminary Report on Patentability in International Appln. No. PCT/US2020/030509, dated Nov. 11, 2021, 7 pages.
PCT International Search Report and Written Opinion in International Appln. No. PCT/US2020/030509, dated Aug. 24, 2020, 12 pages.

* cited by examiner

*Primary Examiner* — Andrew H Nguyen
(74) *Attorney, Agent, or Firm* — Fish & Richardson P.C.

(57) ABSTRACT

The subject matter of this specification can be embodied in, among other things, an assembly that includes a piston having a piston inner surface defining a cylindrical cavity and includes a first axial portion, a piston face at a first end of the first axial portion, a second axial portion at a second end of the first axial portion, and a helical piston thread defined upon the piston inner surface, a bushing configured to contact the piston inner surface, and a lock nut configured to engage the piston and the bushing.

7 Claims, 7 Drawing Sheets

MULTIPLE PIECE PISTON

CROSS-REFERENCE TO RELATED PATENT APPLICATIONS

This application is a divisional of and claims the benefit of priority to U.S. patent application Ser. No. 16/401,713, filed May 2, 2019, the contents of which are incorporated by reference herein.

TECHNICAL FIELD

This instant specification relates to an aircraft thrust reverser actuation system.

BACKGROUND

Contemporary aircraft engines may include a thrust reverser actuation system (TRAS) to assist in reducing the aircraft speed during landing. Typical thrust reversers include one or more movable transcowls that, when in the active position, reverse at least a portion of the airflow passing through the engine.

Mechanically synchronized locking actuators used in TRAS use pistons to maintain synchronization with other actuators through an acme lead screw and lead screw nut assembly. The TRAS actuators are expected to hold high loads in the locked position and achieve smooth synchronization for many cycles. This is typically done with a lead screw nut that has a radially interior threads to engage the lead screw. The lead screw nut typically also has a groove on the radially external diameter to engage a lock key (or lock fingers such as used in finger lock actuators) to mechanically lock the actuator when it is not in use. Examples of synchronized actuators incorporating key type locks are found in U.S. Pat. Nos. 8,715,132 and 8,932,176.

Historically, piston assembly designs have been able to meet requirements with a lock nut material that achieves both high strength and low friction. In other historical piston assemblies, the locking feature is machined into the piston, but this method can be difficult from a manufacturing perspective and can lead to higher costs. Recently, aircraft loads have been increasing, and new designs will be needed to meet these requirements.

SUMMARY

In general, this document describes an aircraft thrust reverser actuation system.

In a general aspect, an assembly includes a piston having a piston inner surface defining a cylindrical cavity and includes a first axial portion, a piston face at a first end of the first axial portion, a second axial portion at a second end of the first axial portion, and a helical piston thread defined upon the piston inner surface, a bushing configured to contact the piston inner surface, and a lock nut configured to engage the piston and the bushing.

Various implementations can include some, all, or none of the following features. The bushing can include a tubular cylindrical body having a bushing outer surface configured to concentrically contact the piston inner surface. The bushing can include a tubular cylindrical body having a bushing inner surface, and a helical bushing thread defined upon the bushing inner surface. The lock nut can have a cylindrical outer surface and a helical nut thread defined upon the cylindrical outer surface. The helical nut thread can be configured to mate with a helical piston thread defined upon the piston inner surface. The assembly can also include a cylindrical first collection of tines arranged upon an axial end of the bushing, and a cylindrical second collection of tines arranged upon an axial end of the lock nut configured to rotationally engage the cylindrical first collection of tines. The assembly can also include a lead screw arranged within the cylindrical cavity. The lead screw can include a helical lead screw thread arranged to engage a helical bushing thread defined upon a tubular inner surface of the bushing. The assembly can also include a locking pin configured to rotationally engage the bushing to the piston.

In another general aspect, a method of assembling a piston assembly includes inserting a bushing into a cylindrical cavity defined by a piston inner surface of a piston, contacting the piston inner surface with a bushing outer surface of a tubular cylindrical body of the bushing, threading a lock nut onto a helical piston thread defined upon the piston, and rotationally engaging a cylindrical first collection of tines arranged upon an axial end of the bushing, and a cylindrical second collection of tines arranged upon an axial end of the lock nut.

Various implementations can include some, all, or none of the following features. The method can also include axially constraining, by the threading, the bushing between the lock nut and a piston face at a first end of a first axial portion of the piston inner surface, wherein the helical piston thread is defined upon a second axial portion of the piston inner surface. The method can also include providing the piston assembly. The piston inner surface can include a first axial portion, a piston face at a first end of the first axial portion, and a second axial portion at a second end of the first axial portion, where the helical piston thread is defined upon the piston inner surface. The bushing can include a tubular cylindrical body having a bushing outer surface configured to concentrically contact the piston inner surface. The bushing can include a tubular cylindrical body having a bushing inner surface, and a helical bushing thread defined upon the bushing inner surface. The lock nut can include a cylindrical outer surface and a helical nut thread defined upon the cylindrical outer surface, wherein the helical nut thread is configured to mate with a helical piston thread defined upon the piston inner surface. The method can also include threading a lead screw through the cylindrical cavity, wherein the lead screw comprises a helical lead screw thread arranged to engage a helical bushing thread defined upon a tubular inner surface of the bushing. The method can also include rotating the lead screw relative to the piston, the bushing, and the lock nut, converting rotation of the lead screw into linear motion of the piston, the bushing, and the lock nut, and moving the piston, the bushing, and the lock nut linearly relative to the lead screw. The process can also include inserting a locking pin into a cavity defined between the piston and the bushing, rotationally engaging, by the locking pin, the piston to the bushing, and transferring, by the locking pin, a rotational force between the piston and the bushing.

The systems and techniques described here may provide one or more of the following advantages. First, a three-piece piston can provide improved performance relative to one-piece designs. The components of the three-piece piston can made from different materials in order to increase the performance of the piston. The piston can include a lock key groove made out of a high strength material to react a load from load keys. The locking nut can be made from a high hardness material to reduce friction. The piston can be coated or otherwise treated to increase its wear properties.

The details of one or more implementations are set forth in the accompanying drawings and the description below. Other features and advantages will be apparent from the description and drawings, and from the claims.

DETAILED DESCRIPTION

This document describes systems and techniques for reversing aircraft turbine engine airflow, including a three-piece piston assembly. A thrust reverser with at least one movable cowl element (i.e., at least one transcowl), which is movable to and from a reversing position, may be used to change the direction of the bypass airflow. In the reversing position, the movable cowl element may be configured to reverse at least a portion of the bypass airflow. As the moveable cowl element is moved into and out of the reversing position by a hydraulic actuator, the forces (e.g., thrust, air resistance) interacting with the moveable cowl element can cause sudden changes in load presented to the actuator. Such forces can be damaging to the system; for example, a hydraulic actuator may initially push the moveable cowl element from the stowed position toward the deployed position, and at some point mid-stroke the aerodynamic forces on the element may provide powerful additional forces that urge the moveable cowl element toward deployment. Such forces may cause the moveable cowl element and/or the actuator to hit their end of travel with an impact that is sufficient to cause damage to the system.

In general, the systems described below overcome this problem by using a hydraulic valve that controls fluid flow through the hydraulic actuator. The valve is mechanically linked to the actuator in a manner such that the valve can vary the fluid flow through the actuator depending on the position of the actuator. The valve can be constructed such that when in use, the fluid flow through the actuator can be restricted at predetermined positions, such as near an end of travel to resist assistive aerodynamic loads, for example, to slow actuator deployment or to soften impacts against the end of travel.

Conventional cascade type thrust reverser actuation systems have hydraulic actuators that include an arm that is attached to the moveable cowl element, and a feedback screw that moves in proportion to the arm. Such thrust reversers also have mounting points to which position sensors (e.g., LVDTs) can be attached. These position sensors are configured to sense the position of the feedback screw, and thereby provide a feedback signal that is representative of the position of the moveable cowl element. The valves described herein can be configured to attach to hydraulic actuators in place of such position sensors, and be actuated by the feedback screw.

Figure 1:
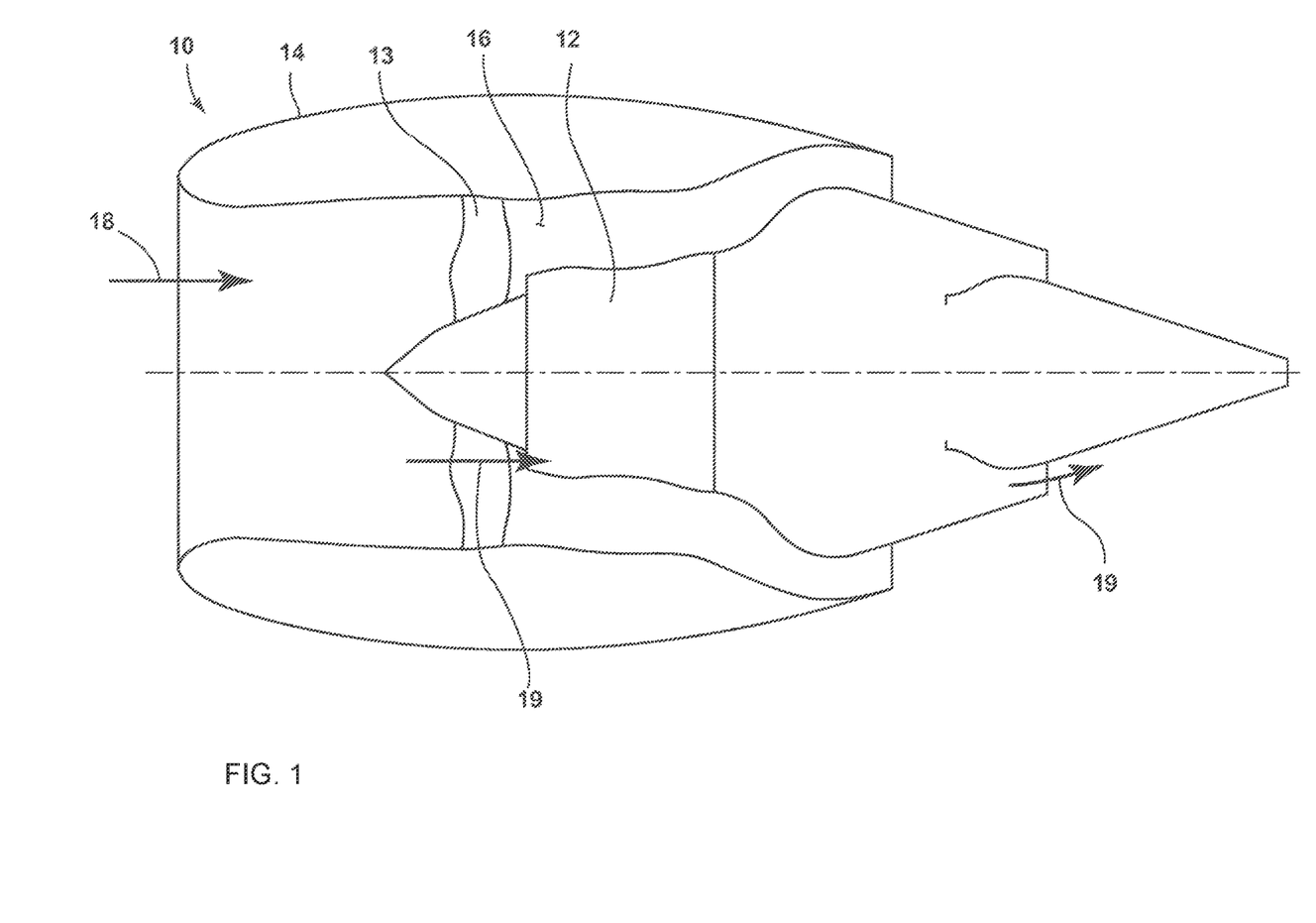
FIG. 1 is a schematic view of an example turbofan jet engine assembly with a portion of the outer nacelle cut away for clarity.

FIG. 1 illustrates an example turbofan jet engine assembly 10 having a turbine engine 12, a fan assembly 13, and a nacelle 14. Portions of the nacelle 14 have been cut away for clarity. The nacelle 14 surrounds the turbine engine 12 and defines an annular airflow path or annular bypass duct 16 through the jet engine assembly 10 to define a generally forward-to-aft bypass airflow path, as schematically illustrated by the arrow 18. A combustion airflow is schematically illustrated by the arrows 19.

Figure 2:
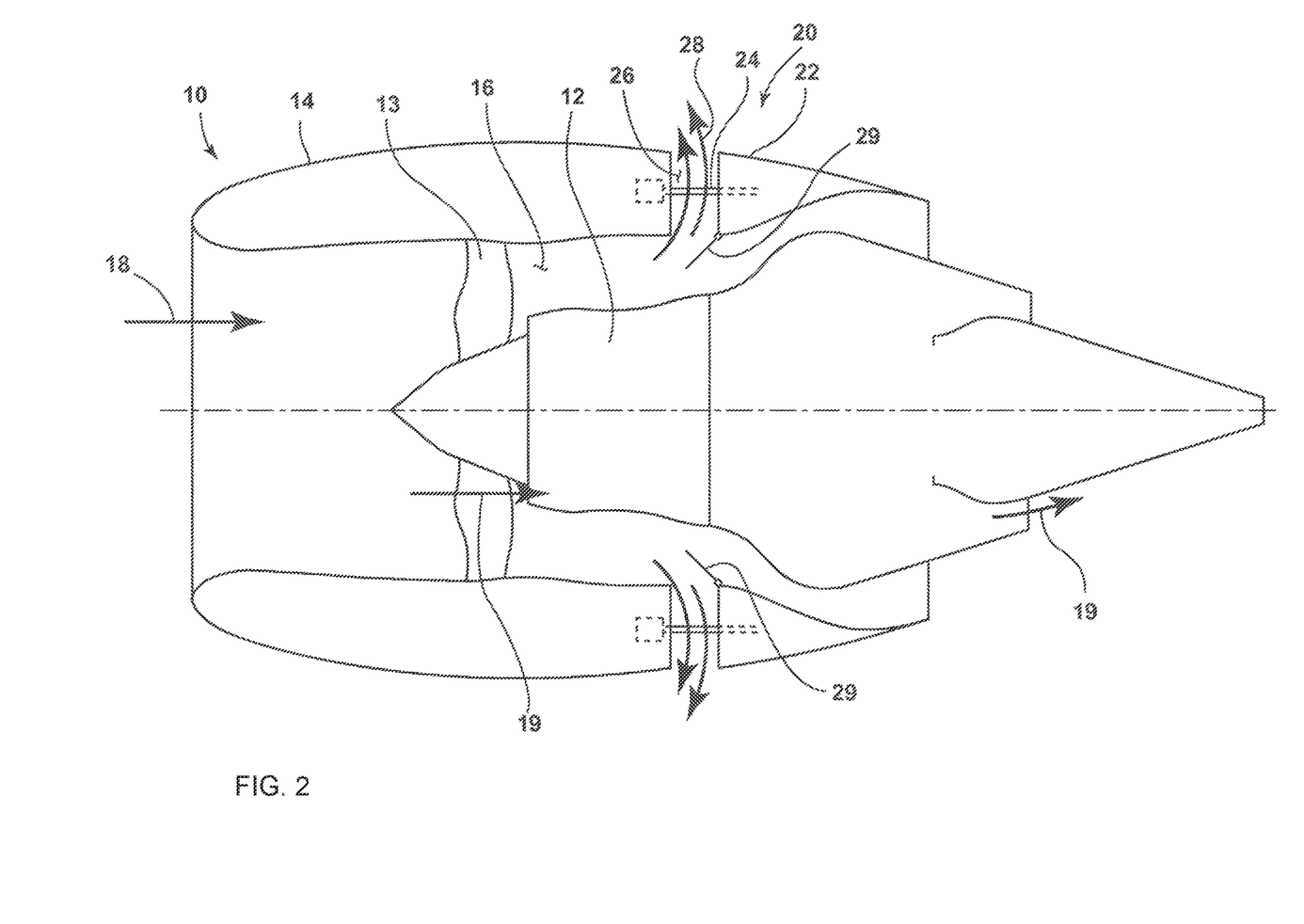
FIG. 2 is a schematic view of the engine assembly of FIG. 1 with an exemplary thrust reverser.

A thrust reverser with at least one movable element, which is movable to and from a reversing position, may be used to change the direction of the bypass airflow. In the reversing position, the movable element may be configured to reverse at least a portion of the bypass airflow. There are several methods of obtaining reverse thrust on turbofan jet engine assemblies. FIG. 2 schematically illustrates one example of a thrust reverser 20 that may be used in the turbofan jet engine assembly 10. The thrust reverser 20 includes a movable element 22. The movable element 22 has been illustrated as a cowl portion that is capable of axial motion with respect to the forward portion of the nacelle 14. A hydraulic actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap 29 may be included to aid in directing the airflow path between the movable element 22 and the forward portion of the nacelle 14.

Figure 3:
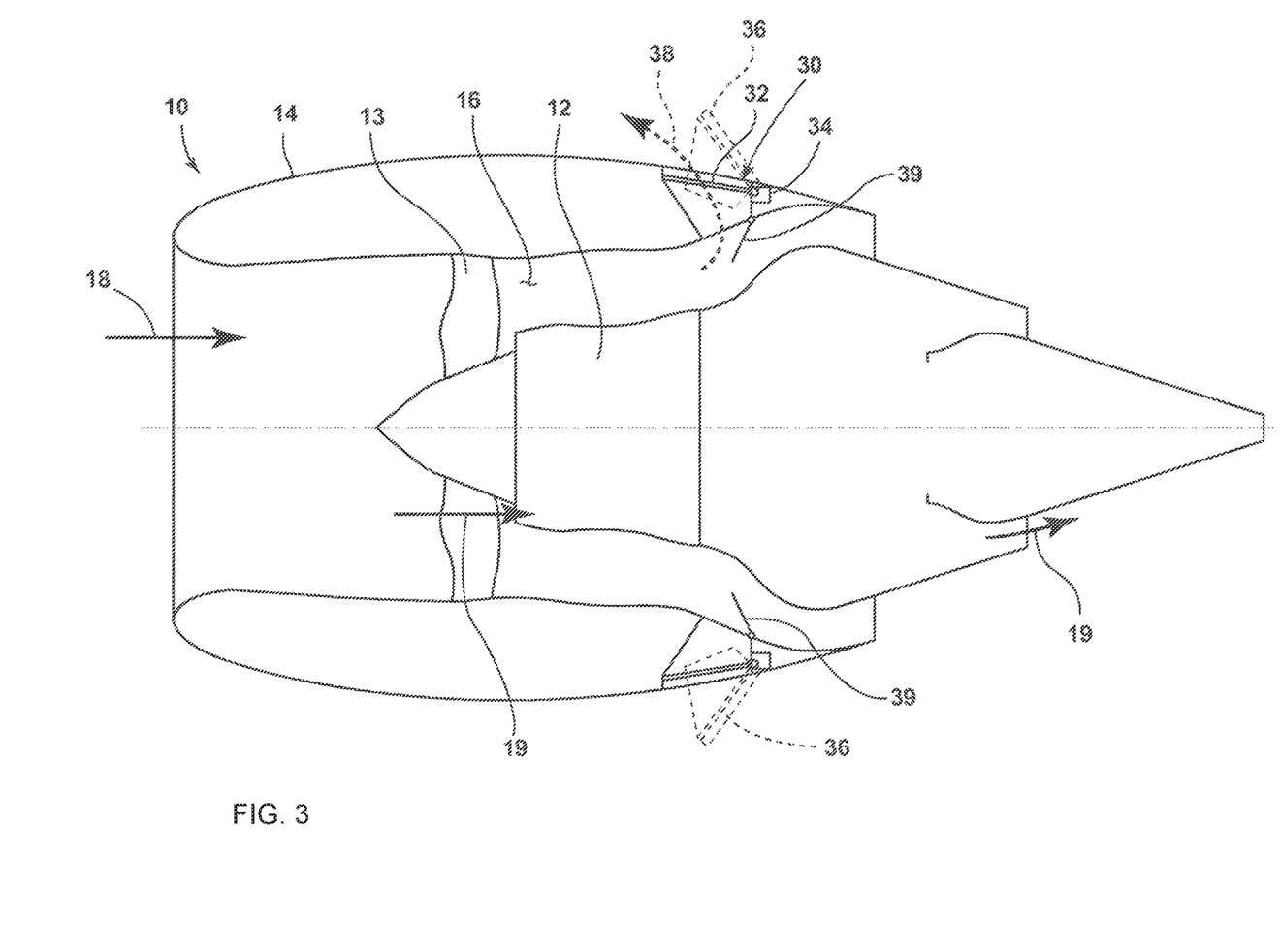
FIG. 3 is a schematic view of the engine assembly of FIG. 1 with an alternative exemplary thrust reverser.

FIG. 3 schematically illustrates an alternative example of a thrust reverser 30. The thrust reverser 30 includes a movable element 32. The movable element 32 has been illustrated as a deflector, which may be built into a portion of the nacelle 14. A hydraulic actuator 34 may be coupled to the movable element 32 to move the movable element 32 into and out of the reversing position. In the reversing position, shown in phantom and indicated at 36, the movable element 32 turns the air outward and forward to reverse its direction as illustrated by the arrows 38. An optional deflector or flap 39 may be included to aid in directing the airflow path outward.

In both illustrative examples, the thrust reverser changes the direction of the thrust force. Both the thrust reverser 20 and the thrust reverser 30 have been described as hydraulically operated systems and a hydraulic actuator has been schematically illustrated. In some embodiments, the thrust reverser 20 and/or the thrust reverser 30 can be powered by other fluids (e.g., pneumatic), by electro-mechanical actuators, or by any other appropriate power source or actuator type.

Figure 4:
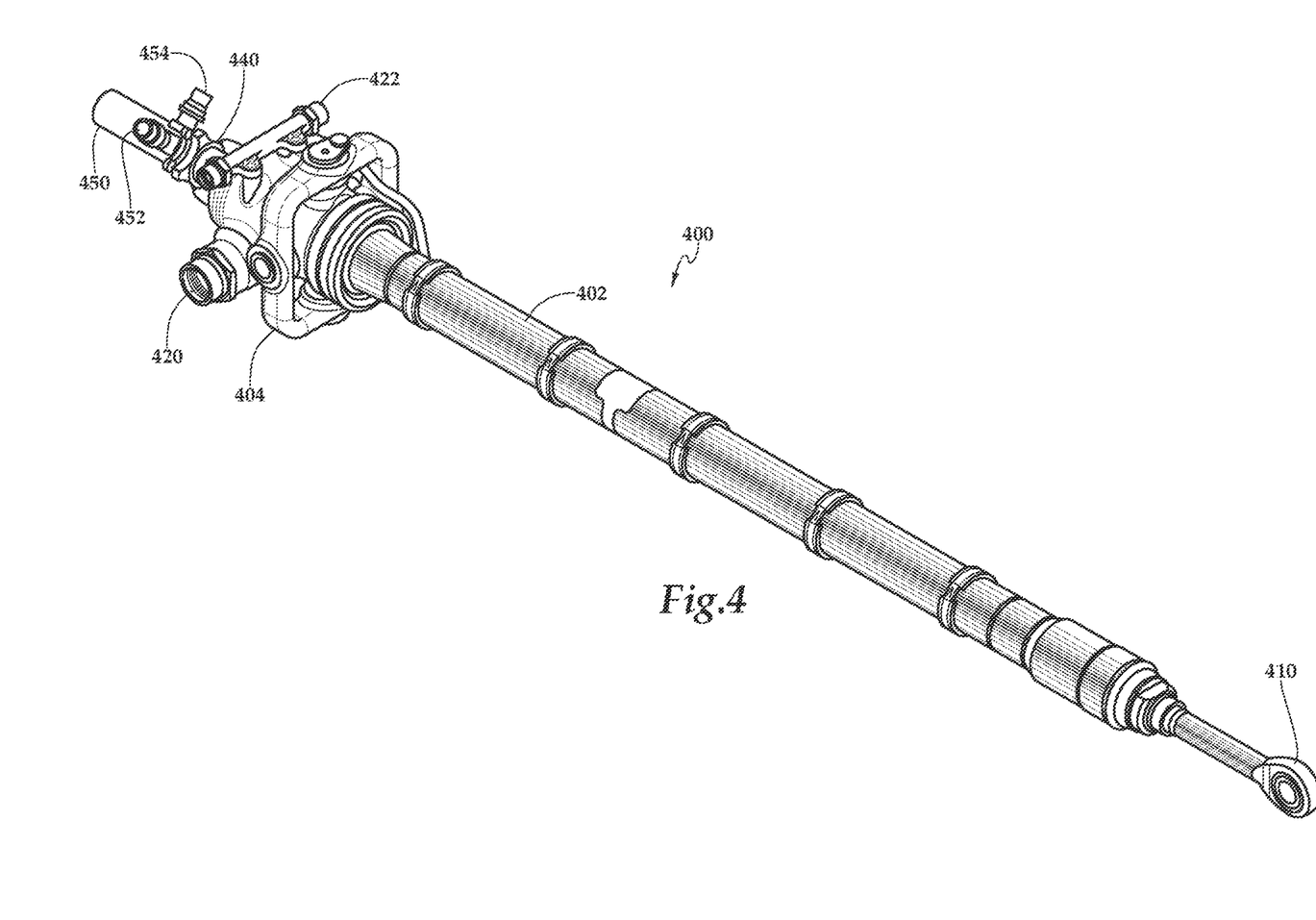
FIG. 4 is a perspective view of an example hydraulic actuator.

FIG. 4 is a perspective view of an example hydraulic actuator 400. In some embodiments, the hydraulic actuator 400 can be the example hydraulic actuator 24 of FIG. 2 or the example hydraulic actuator 34 of FIG. 3. The hydraulic actuator 400 includes a housing 402 and a gimbal 404. In some embodiments, the gimbal 404 can be configured to removably affix the housing 402 to a structural member, such as the example nacelle 14.

A rod end 410 is configured to extend and retract relative to the housing 402. In some embodiments, the rod end 410 can be configured to removably affix the hydraulic actuator 400 to a moveable element, such as the example moveable element 22 or the example moveable element 32. The rod end 410 is configured to extend and retract linearly, relative to the housing 402.

The hydraulic actuator 400 includes an actuator deploy port 420 and an actuator stow port 422. The hydraulic actuator 400 is configured to extend the rod end 410 when fluid (e.g., hydraulic fluid) is flowed to the actuator deploy port 420 and retract the rod end 410 when fluid is flowed to the actuator stow port 422.

The housing 402 includes a mount point 440. The mount point 440 is configured for the removable attachment of a position sensor such as an LVDT. However, in the illustrated example, a control valve 450 is removably affixed to the hydraulic actuator 400 at the mount point 440. The control valve 450 is a hydraulic valve that includes an inlet fluid port 452 and an outlet fluid port 454.

Figure 5:
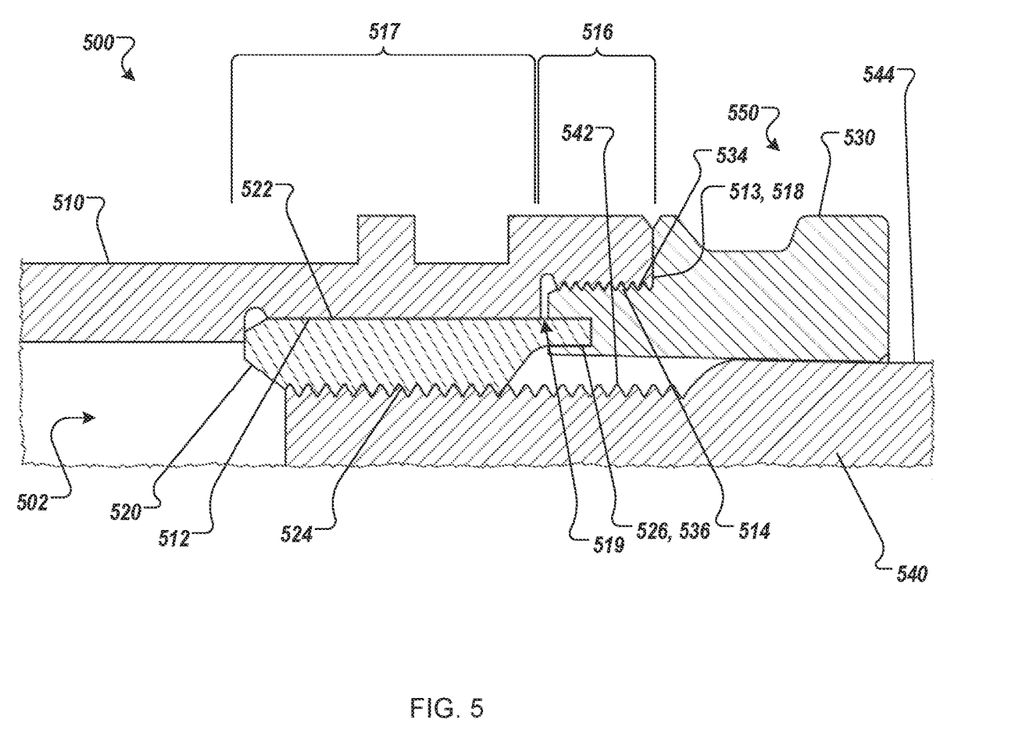
FIG. 5 is a cross sectional view of an example three-piece piston assembly of the hydraulic actuator of FIG. 4.

As aircraft loads increase, new piston designs are needed in order to provide enough strength to maintain TRAS synchronization with other actuators through an acme lead screw and lead screw nut assembly, while also being lightweight and economical to manufacture. FIG. 5 is a cross sectional view of an example three-piece piston assembly 500 of the hydraulic actuator of FIG. 4. In general, the design and implementation of the example piston assembly 500 provides such strength, weight, and manufacturability.

In general, in order to meet larger loads, previous designs have implemented increases in lock nut sizes. However, increasing the lock nut size can significantly increase the overall size and weight of an actuator used in weight-sensitive applications such as aircraft. In general, the piston assembly 500 solves this issue by splitting the piston into three pieces that can be assembled together, and the three pieces can be designed to use different materials that can be selected for their respective features, all within the small space of the piston head and while still using conventional technology in regards to manufacturing and assembly.

The piston assembly 500 includes an actuator piston 510, a bushing 520, a lock nut 530, and an actuator lead screw 540. The actuator piston 510 has two radially interior surfaces that define an interior cavity 502. An axial portion 516 of the interior cavity 502 is defined by a surface 512 that is smooth in order to engage a smooth surface 522 the bushing 520. The axial portion 516 includes a piston face 513 at an end 518. At an end 519, an axial portion 517 of the interior cavity 502 is defined by a surface 514 that is threaded to engage a threaded surface 534 of the lock nut 530.

The bushing 520 includes a surface 524. The surface 524 is defined as a radially interior thread configured to engage a threaded surface 542 of the actuator lead screw 540. A surface 522 is smooth and abuts the surface 512 of the interior cavity 502 of the piston assembly 500.

A surface 544 of the actuator lead screw 540 is configured as a radially exterior surface that is smooth and designed to fit into the internal cavity 502 of the actuator piston 510.

An axial surface of the bushing 520 includes a collection of tines 526 arranged as a castle feature and/or serrations. The lock nut 530 includes a collection of tines 536 configured to engagingly mate with the collection of tines 526. The tines 526 and the tines 536 are configured to engage axially in order to rotationally engage the lock nut 530 with the bushing 520.

The lock nut 530 retains the bushing 520 within the internal cavity 502 of the actuator piston 510. The lock nut 530 prevents rotation of the bushing 520 relative to the lock nut 530 when the lock nut 530 is installed into the actuator piston 510. The lock nut 530 is located at an end 550 of the actuator piston 510 proximal to the piston head. The threaded surface 534 is configured to engage to a corresponding thread of the threaded surface 514 on the radially interior diameter of the actuator piston 510. In its assembled configuration, the threaded surface 534 matingly engages the threaded surface 514 in order to axially retain the actuator piston 510 and the lock nut 530.

In some embodiments, each of the actuator piston 510, the bushing 520, the lock nut 530, and the actuator lead screw 540 can be formed from different materials. The materials can be selected based on the purpose and/or performance characteristics of each of these components. For example, the material used to manufacture the actuator piston 510 can be selected for high strength, such as 15-5 PH. The 15-5 PH alloy is martensitic in structure in the annealed condition and is further strengthened by a relatively low temperature heat treatment which precipitates a copper containing phase in the alloy. 15-5 PH is also referred to as XM-12 in some specifications. In another example, the material used to manufacture the bushing 520 can be selected for low-friction characteristics, such as GRAPH MO. GRAPH MO tool steel is an oil-hardening, graphitic tool steel that resists metal-to-metal sliding wear and galling. The steel contains a uniform dispersion of graphite particles which impart machinability and non-seizing characteristics. The graphite particles make the steel self-lubricating in dry environments, and help to retain oil in lubricated environments. GRAPH MO tool steel can be hardened to over 60 Rockwell C from a relatively low hardening temperature, which minimizes size change and distortion during heat treatment. In another example, the material used to manufacture the lock nut 530 can be selected for high strength, such as 15-5 PH, TOUGHMET, or similar materials. TOUGHMET is a high-strength, spinodally-hardened, copper nickel tin alloy that exhibits corrosion resistance, stress corrosion cracking resistance, anti-friction properties, is non-magnetic, and exhibits lubricity and wear resistance under severe loading conditions. Splitting the piston assembly 500 into multiple pieces of different materials connected by one threaded and one slotted interface can provide improved functionality, such as load capability.

Figure 6:
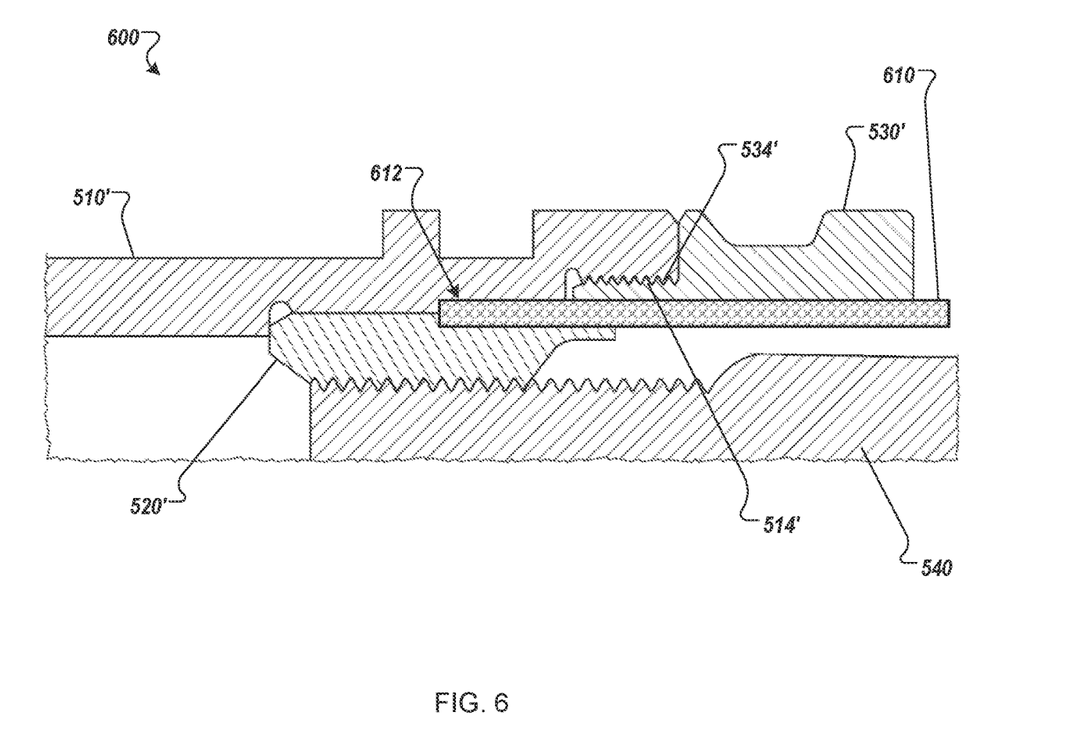
FIG. 6 is a cross sectional view of another example three-piece piston assembly of the hydraulic actuator of FIG. 4.

FIG. 6 is a cross sectional view of another example three-piece piston assembly 600 of the hydraulic actuator of FIG. 4. In general, the design and implementation of the example piston assembly 600 is a modification of the example piston assembly 500 of FIG. 5.

In general, the piston assembly 600 differs from the piston assembly 500 by the inclusion of a locking pin 610. The locking pin 610 is configured to directly engage a lead screw nut 520' to a piston 510'.

The piston assembly 600 includes an actuator piston 510', a bushing 520', a lock nut 530', and the actuator lead screw 540. The actuator piston 510' defines a portion of an interior cavity 612. The bushing 520' defines another portion of the interior cavity 612. When the actuator piston 510' and the bushing 520' are assembled, the interior cavity 612 is defined with an axial shape that is configured to accept insertion of the locking pin 610. In use, rotational forces between the actuator piston 510' and the bushing 520' are transferred primarily though the locking pin 610, and little or no rotational force is transmitted through a surface 514' that is threaded to engage a threaded surface 534'.

Figure 7:
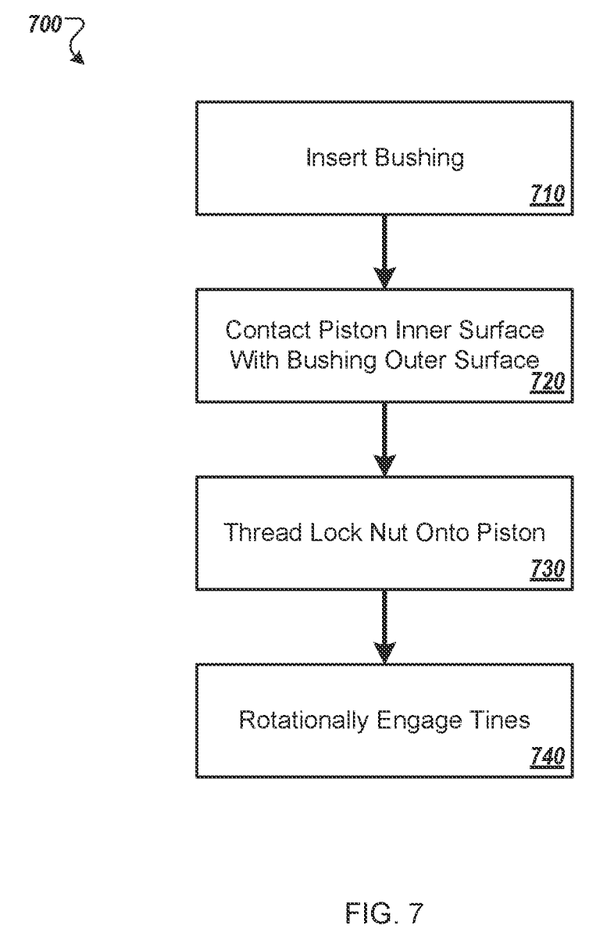
FIG. 7 is a flow diagram of an example process for assembling the example three-piece piston assembly of FIG. 5.

FIG. 7 is a flow diagram of an example assembly process. The process 700 may be performed, for example, to assemble the example piston assembly 500 of FIG. 5 or the example piston assembly 6 of FIG. 6. For clarity of presentation, the description that follows uses the piston assembly 500 as an example for describing the process 700. However, other embodiments of the piston assembly 500 may be used to perform the process 700.

In general, during installation the bushing 520 is inserted into the actuator piston 510. The lock nut 530 is then installed. The tines 526 engage the corresponding feature on the lock nut 530. The bushing 520 and lock nut 530 then rotate together during installation until the bushing 520 abuts the actuator piston 510. This configuration allows for convenient assembly of a multi-piece and multi-material synchronized actuator piston.

At 710, a bushing is inserted into a cylindrical cavity defined by a piston inner surface of a piston. For example, the bushing 520 is inserted into the internal cavity 502 defined in the actuator piston 510, such that the surface 522 is brought into contact with the surface 512.

In some implementations, the piston inner surface can include a first axial portion, a piston face at a first end of the first axial portion, and a second axial portion at a second end of the first axial portion, where the helical piston thread is defined upon the piston inner surface. For example, the actuator piston 510 has two radially interior surfaces that define an interior cavity 502. The axial portion 516 of the interior cavity 502 is defined by the surface 512 and includes the piston face 513 at the end 518. At the end 519, the axial portion 517 of the interior cavity 502 is defined by the surface 514.

At 720, the piston inner surface is contacted with a bushing outer surface of a tubular cylindrical body of the bushing. In some implementations, the bushing include a tubular cylindrical body having a bushing outer surface configured to concentrically contact the piston inner surface. In some implementations, the bushing can include a tubular cylindrical body having a bushing inner surface, and a helical bushing thread defined upon the bushing inner surface. For example, the bushing 520 includes a surface 524. The surface 524 is defined as a radially interior thread configured to engage a threaded surface 542 of the actuator lead screw 540. The surface 522 is smooth and abuts the surface 512 of the interior cavity 502 of the piston assembly 500.

At 730, a lock nut is threaded onto a helical piston thread defined upon the piston. In some implementations, the lock nut can have a cylindrical outer surface and a helical nut thread defined upon the cylindrical outer surface, where the helical nut thread is configured to mate with a helical piston thread defined upon the piston inner surface. For example, the surface 514 of the actuator piston 510 is threaded to engage the threaded surface 534 of the lock nut 530.

In some implementations, the process 700 can also include axially constraining, by the threading, the bushing between the lock nut and a piston face at a first end of a first axial portion of the piston inner surface, wherein the helical piston thread is defined upon a second axial portion of the piston inner surface. For example, the lock nut 530 retains the bushing 520 within the internal cavity 502 of the actuator piston 510. The lock nut 530 prevents rotation of the bushing 520 relative to the lock nut 530 when the lock nut 530 is installed into the actuator piston 510, and the threaded surface 534 matingly engages the threaded surface 542 in order to axially retain the actuator piston 510 and the lock nut 530.

At 740, a cylindrical first collection of tines, arranged upon an axial end of the bushing, is engaged with a cylindrical second collection of tines arranged upon an axial end of the lock nut. For example, the tines 526 and the tines 536 are configured to engage axially in order to rotationally engage the lock nut 530 with the bushing 520.

In some implementations, the process 700 can also include providing the piston assembly. For example, the actuator piston 510, the bushing 520, and the lock nut 530 can be provided for assembly into the piston assembly 500.

In some implementations, the process 700 can also include threading a lead screw through the cylindrical cavity, where the lead screw has a helical lead screw thread arranged to engage a helical bushing thread defined upon a tubular inner surface of the bushing. For example, the surface 524 is defined as a radially interior thread configured to engage the threaded surface 542 of the actuator lead screw 540.

In some implementations, the process 700 can also include rotating the lead screw relative to the piston, the bushing, and the lock nut, converting rotation of the lead screw into linear motion of the piston, the bushing, and the lock nut, and moving the piston, the bushing, and the lock nut linearly relative to the lead screw. For example, the actuator lead screw 540 can be rotated relative to the assembled configuration of the actuator piston 510, the bushing 520, and the lock nut 530. As the actuator lead screw 540 rotates, the threaded surface 542 threads and/or unthreads into and/or out of the surface 524. As the actuator lead screw 540 threads and unthreads, the rotational movement of the actuator lead screw 540 is converted into linear movement of the assembled configuration of the actuator piston 510, the bushing 520, and the lock nut 530 relative to the actuator lead screw 540.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of assembling a piston assembly, the method comprising:
   inserting a bushing into a cylindrical cavity defined by a piston inner surface of a piston, the piston inner surface comprising:
   a first axial portion;
   a piston face at a first end of the first axial portion; and
   a second axial portion at a second end of the first axial portion,
   wherein a helical piston thread is defined upon the piston inner surface and the bushing comprising a tubular cylindrical body having a bushing inner surface and a helical bushing thread defined upon the bushing inner surface;
   contacting the piston inner surface with a bushing outer surface of a tubular cylindrical body of the bushing;
   threadedly engaging a lock nut onto the helical piston thread;
   rotationally engaging the lock nut to the bushing and the piston face of the piston;
   rotationally engaging a cylindrical first collection of tines arranged as a castle feature upon an axial end of the bushing, and a cylindrical second collection of tines arranged upon an axial end of the lock nut; and preventing, by engagement of the cylindrical first collection of tines and the cylindrical second collection of tines, rotation of the bushing relative to the lock nut.

2. The method of claim 1, further comprising axially constraining the bushing by the lock nut, wherein the helical piston thread is defined upon the second axial portion of the piston inner surface.

3. The method of claim 1, further comprising providing the piston assembly.

4. The method of claim 1, wherein the bushing outer surface is configured to concentrically contact the piston inner surface.

5. The method of claim 1, wherein the lock nut comprises a cylindrical outer surface and a helical nut thread defined upon the cylindrical outer surface, wherein the helical nut thread is configured to mate with the helical piston thread defined upon the piston inner surface.

6. The method of claim 1, further comprising threading a lead screw through the cylindrical cavity, wherein the lead screw comprises a helical lead screw thread arranged to engage the helical bushing thread defined upon a tubular inner surface of the bushing.

7. The method of claim 6, further comprising:
rotating the lead screw relative to the piston, the bushing, and the lock nut;
converting rotation of the lead screw into linear motion of the piston, the bushing, and the lock nut; and
moving the piston, the bushing, and the lock nut linearly relative to the lead screw.

\* \* \* \* \*